(12) United States Patent
Van den Bossche et al.

(10) Patent No.: US 11,634,605 B2
(45) Date of Patent: *Apr. 25, 2023

(54) POLYMERIC COATING COMPOSITIONS AND ARTICLES COATED WITH THE SAME

(71) Applicant: ExxonMobil Chemical Patents Inc., Baytown, TX (US)

(72) Inventors: Linda M. Van den Bossche, Zwijndrecht (BE); Joe J. Thoppil, Karnataka (IN); Catherine A. V. Quintin, Waterloo (BE)

(73) Assignee: ExxonMobil Chemical Patents Inc., Baytown, TX (US)

(*) Notice: Subject to any disclaimer, the term of this patent is extended or adjusted under 35 U.S.C. 154(b) by 434 days.

This patent is subject to a terminal disclaimer.

(21) Appl. No.: 16/957,165

(22) PCT Filed: Mar. 19, 2019

(86) PCT No.: PCT/US2019/022999
§ 371 (c)(1),
(2) Date: Jun. 23, 2020

(87) PCT Pub. No.: WO2019/183116
PCT Pub. Date: Sep. 26, 2019

(65) Prior Publication Data
US 2020/0347257 A1 Nov. 5, 2020

Related U.S. Application Data

(60) Provisional application No. 62/646,952, filed on Mar. 23, 2018.

(51) Int. Cl.
*C09D 123/06* (2006.01)
*B32B 27/10* (2006.01)
(Continued)

(52) U.S. Cl.
CPC ............ *C09D 123/06* (2013.01); *B32B 27/10* (2013.01); *B32B 27/308* (2013.01); *B32B 27/32* (2013.01);
(Continued)

(58) Field of Classification Search
CPC ............ C09D 123/06; C09D 123/0869; C09D 123/0815; B32B 27/10; B32B 27/308;
(Continued)

(56) References Cited

U.S. PATENT DOCUMENTS 6,565,934 B1  5/2003  Fredricks et al.
2003/0215659 A1  11/2003  Farley et al.
(Continued)

FOREIGN PATENT DOCUMENTS

EP           0925174 B1   3/2016
WO    WO 1994-026816 A1  11/1994

*Primary Examiner* — Nancy R Johnson
(74) *Attorney, Agent, or Firm* — ExxonMobil Chemical Patents Inc.-Law Department

(57) ABSTRACT

Polymeric coating compositions and articles coated with the polymeric coating compositions are provided. The polymeric coating composition can include an ethylene-based polymer that exhibits desirable melting properties and molecular weight distribution. The polymeric coating composition can provide a thin coating layer on an article while still providing advantageous properties, such as seal strength.

19 Claims, 8 Drawing Sheets

(51) Int. Cl.
  *B32B 27/30* (2006.01)
  *B32B 27/32* (2006.01)
  *C09D 123/08* (2006.01)

(52) U.S. Cl.
  CPC .... *C09D 123/0869* (2013.01); *B32B 2250/03* (2013.01); *B32B 2255/12* (2013.01); *B32B 2255/26* (2013.01); *B32B 2255/28* (2013.01); *B32B 2307/50* (2013.01); *B32B 2307/718* (2013.01); *B32B 2307/72* (2013.01); *B32B 2307/7246* (2013.01); *B32B 2323/046* (2013.01); *B32B 2333/08* (2013.01); *B32B 2333/12* (2013.01); *B32B 2439/02* (2013.01); *B32B 2439/70* (2013.01); *B32B 2581/00* (2013.01)

(58) Field of Classification Search
  CPC . B32B 27/32; B32B 2250/03; B32B 2255/12; B32B 2255/26; B32B 2255/28; B32B 2307/50; B32B 2307/718; B32B 2307/72; B32B 2307/7246; B32B 2323/046; B32B 2333/08; B32B 2333/12; B32B 2439/02; B32B 2439/70; B32B 2581/00; C08L 2203/162; C08L 2205/00; C08L 23/0815
  See application file for complete search history.

(56) References Cited

U.S. PATENT DOCUMENTS

| | | |
|---|---|---|
| 2007/0083009 A1 | 4/2007 | Chai |
| 2010/0068488 A1 | 3/2010 | Chai |
| 2012/0130006 A1 | 5/2012 | Van den Bossche et al. |
| 2014/0100343 A1* | 4/2014 | Ker .................. C08F 4/65908 526/170 |
| 2014/0367456 A1 | 12/2014 | Jerdee |
| 2015/0298438 A1 | 10/2015 | Nevalainen et al. |
| 2016/0168799 A1 | 6/2016 | Constant |
| 2017/0008264 A1* | 1/2017 | Nevalainen ......... B29C 48/0014 |
| 2018/0201705 A1 | 7/2018 | Desportes et al. |

* cited by examiner

POLYMERIC COATING COMPOSITIONS AND ARTICLES COATED WITH THE SAME

CROSS REFERENCE TO RELATED APPLICATIONS

This application claims the benefit to Ser. No. 62/646,952, filed Mar. 23, 2018, the disclosure of which is hereby incorporated by reference in its entirety.

FIELD OF THE INVENTION

Polymeric coating compositions and articles coated with the same are provided.

BACKGROUND OF THE INVENTION

Polymeric coating compositions can be used for coating various substrates in order to impart certain properties to articles made therefrom, such as protection from moisture when containing food or beverages. In various applications, such as disposable cups, tableware, and industrial wraps, a thick polymeric coating is not required. However, from a processing/manufacturing standpoint, conventional choices of polymeric coating compositions are unable to provide a thin coating to the substrate in an efficient manner.

U.S. Pat. No. 6,565,934 discloses a heat insulating paper cup having an improved seal. The body member of the cup is coated on an outside surface with foamed low density polyethylene, and coated with an unfoamed modified low density polyethylene on its inside surface. The bottom panel member of the cup is coated with a foamed or unfoamed low density polyethylene, or foamed or unfoamed modified low density polyethylene. Upon the application of heat and pressure during fabrication, the body member and the bottom panel member form a bonding layer at the interface between the two members.

U.S. Publication No. 2014/0367456 discloses a polyolefin and cellulose laminate for food or beverage containers. The container can be coated with one to seven layers. The layers can include metallocene catalyzed polyethylene alone or in addition to conventional autoclave low density polyethylene. The containers may be coated by a co-extrusion process.

U.S. Publication 2015/0298438 discloses a polymer-coated packaging material having three layers. The inner coating layer includes a polymer blend having 10-25 wt % of a low density polyethylene and 75-90 wt % of another polyethylene with a higher melt viscosity than the low density polyethylene. The middle coating layer can include more than 90 wt % of a high density polyethylene. The outer coating layer can include the same polymer blend as the inner coating layer.

U.S. Publication No. 2016/0168799 discloses a coated paper cup. The paper cup can include a first coating having a polyethylene copolymer on the inside of the bottom surface of the cup. The paper cup can also include an aqueous-based coating on the inside surface of the side portion of the cup. The aqueous-based coating can include an aqueous-based polymer that is water-soluble or water-dispersible.

WO 2005/019333 discloses polymer blends that include 1-99% by weight of a copolymer of ethylene and an alpha olefin having 3-10 carbon atoms, and 1-99% by weight of a low density polyethylene. The copolymer can be prepared via a metallocene catalyst. The polymer blends have a melt elastic modulus from 20 to 200 Pa and can be used for extrusion coating applications.

WO 2011/037590 discloses a polymeric composition for use as a film or coating. The composition includes a first component that is a copolymer of ethylene and one or more $C_3$ to $C_{20}$ alpha-olefin comonomers and a second component that is low density polyethylene. The first component has a density of 0.911 to 0.918 g/cm$^3$, and the second component has a melt index that is less than the melt index of the first component.

WO 02/00436 discloses a polymer blend for use as a film or coating. The polymer blend includes 1-99% by weight of a metallocene-produced very low density polyethylene having a density less than 0.916 g/cm$^3$, and 1-99% by weight of a low density polyethylene having a density of 0.916 to 0.928 g/cm$^3$. The very low density polyethylene can have a melt index from 6 to 15 dg/min.

SUMMARY OF THE INVENTION

In one aspect, a coated article is provided. The coated article can include a fibrous substrate, such as a paperboard substrate. The coated article can further include a first polymeric coating having opposing first and second surfaces. The first surface of the first polymeric coating can be secured to at least a portion of a surface of the fibrous substrate. The first polymeric coating can have a coat weight of about 7 g/m$^2$ or less. The first polymeric coating can correspond to a coating layer suitable for use as a tie layer, such as an ethylene acrylic acid copolymer or another type of ethylene homopolymer or copolymer. The coated article can further include a second polymeric coating secured to the second surface of the first polymeric coating. The second polymeric coating can have a coat weight of about 15 g/m$^2$ or less. The second polymeric coating can include at least about 40 wt % of an ethylene-based polymer, such as an ethylene-based copolymer. The ethylene-based polymer can have one or more of the following properties: a) a melt index of from about 5 g/10 min to about 30 g/10 min; b) a melt elastic modulus G' (G"=500 Pa) at 170° C. below 15 Pa; c) a relaxation time lambda at 170° C. below 0.003 s; d) at least two second melt temp peaks between 110° C. and 120° C.; e) a weight average molecular weight (Mw) of from about 10,000 g/mol to about 55,000 g/mol; f) a molecular weight distribution (Mw/Mn) of from about 2.0 to about 5.0; and g) a Mz/Mw ratio of from about 1.5 to about 2.1.

In another aspect, a method of manufacturing a coated article for a container is provided. The method can includes receiving a coated fibrous substrate having inner and outer polymeric layers. A first side of the inner polymeric layer can be secured to at least a portion of a surface of the fibrous substrate. Additionally or alternately, at least a portion of the outer polymeric layer can be secured to at least a portion of a second side of the inner polymeric layer. The outer polymeric layer can have a coat weight of about 15 g/m$^2$ or less. The outer polymeric layer can include at least about 40 wt % of an ethylene-based polymer, such as an ethylene-based copolymer. The ethylene-based polymer can have one or more of the following properties: a) a melt index of from about 5 g/10 min to about 30 g/10 min; b) a melt elastic modulus G' (G"=500 Pa) at 170° C. below 15 Pa; c) a relaxation time lambda at 170° C. below 0.003 s; d) at least two second melt temp peaks between 110° C. and 120° C.; e) a weight average molecular weight (Mw) of from about 10,000 g/mol to about 55,000 g/mol; f) a molecular weight distribution (Mw/Mn) of from about 2.0 to about 5.0; and g) a Mz/Mw ratio of from about 1.5 to about 2.1. The method can further include sealing a first end of the coated fibrous substrate to one of: (i) a second end of the coated fibrous substrate; (ii) a portion of a separate fibrous substrate; or (iii) a combination thereof. This can allow formation of a sealed seam of a coated article. The sealed seam can have, for example, a seal strength of about 6.0 N/15 mm or more as measured by the Seal Strength Test Method.

DETAILED DESCRIPTION OF THE INVENTION

Overview

Figure 1:
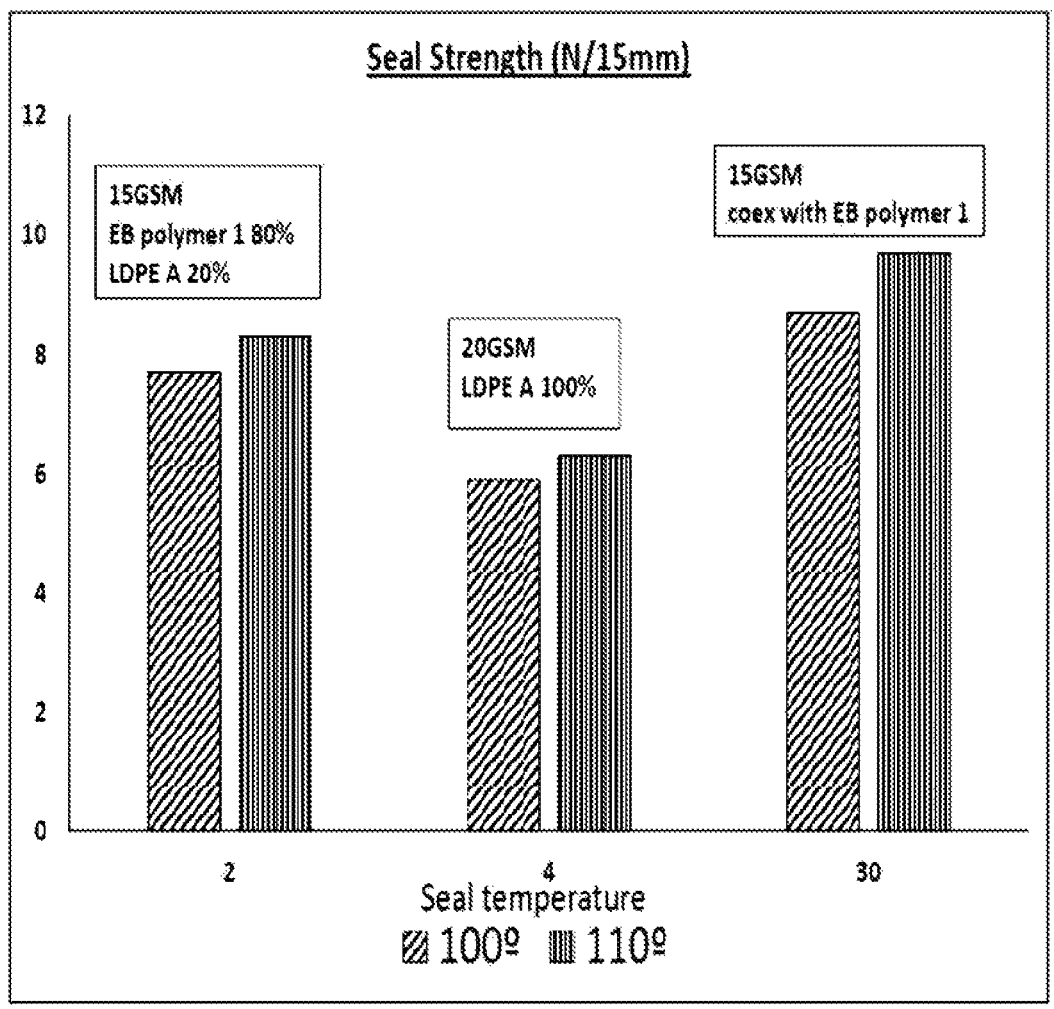
FIG. 1 shows results of the Seal Strength Test on paper substrates coated with various polymeric coating compositions, with seals formed at 100° C. and 110° C.

In various aspects, polymeric coating compositions and articles coated with the polymeric coating compositions are provided. In one or more aspects, the polymeric coating composition can include an ethylene-based polymer that exhibits desirable melting properties, flow behavior, and molecular weight distribution. It has been unexpectedly discovered that this combination of melting properties and molecular weight distribution allows unexpectedly thin coating layers to be formed while still providing advantageous properties as a top coating layer, such as seal strength.

Traditionally, low density polyethylene (LDPE) has been utilized for coating paper or paperboard for use in forming coated food or beverage articles, for example. This LDPE coating can be used to impart various properties, such as protection from moisture or protection from physical handling. The LDPE coating can also be used as a medium for seal-closing a portion of an article. However, conventional LDPE coatings are limited in their process-ability, such as draw down (ability to form a thin film without breaking) at high line speed and/or adhesion to paper-based substrates in conventional processing conditions. While converters may be utilized to aid in mitigation of the loss of adhesion, this may adversely affect the hot tack performance of such a coating composition.

The polymeric coating compositions disclosed herein alleviate one or more of the above problems. For example, in certain aspects, the polymeric coating compositions include an ethylene-based polymer in an amount of at least about 20 wt %. In such aspects, the ethylene-based polymer exhibits:
  a) a melt index of from about 5 g/10 min to about 30 g/10 min;
  b) a melt elastic modulus G' (G"=500 Pa) at 170° C. below 15 Pa;
  c) a relaxation time lambda at 170° C. below 0.003 s;
  d) at least two second melt temperature peaks between 110° C. and 120° C.;
  e) a weight average molecular weight (Mw) of from about 10,000 g/mol to about 55,000 g/mol;
  f) a molecular weight distribution (Mw/Mn) of from about 2.0 to about 5.0; and
  g) a Mz/Mw ratio of from about 1.5 to about 2.1.

In certain aspects, the polymeric coating compositions can include a blend of two or more polymers. In one aspect, the blend can include the ethylene-based polymer as a first polymeric component in an amount of from about 20 wt % to about 80 wt %, and a second polymeric component in an amount of from about 20 wt % to about 80 wt %. The second polymeric component can include: a low-density polyethylene; an ethylene acrylic acid co-polymer; an ethylene-methacrylic acid co-polymer; an ethyl-methyl acrylate co-polymer; a polymer produced by polymerization at a pressure of 50 MPa-g or more; or a mixture thereof. In various aspects, the polymeric coating compositions can also be additivated with organic or inorganic additives, which is discussed further below.

Unexpectedly, it has been discovered that the above-listed properties of the ethylene-based polymer, alone or in the polymeric blend, can be beneficial for forming thin polymeric coating compositions. For instance, the polymeric coating compositions can exhibit enhanced drawn down and neck in processing properties, which can facilitate the application of a thin coating on the substrate at high line processing speeds. Furthermore, it has been unexpectedly discovered that these thin coatings of the polymeric coating compositions described herein can provide enhanced seal strength to a coated article compared to conventional polymeric coatings at similar coat weights.

For convenience, in this description there are specific references to a polymeric coating composition for use as a coating layer on a paper substrate. It is understood that these references illustrate the more general concept of thin coating layers that include an ethylene-based polymer that provides unexpected benefits, independent of a specific type of substrate.

Polymeric Coating Compositions

As discussed above, in certain aspects, the polymeric coating compositions can include an ethylene-based polymer having the following properties:
  a) a melt index of from about 5 g/10 min to about 30 g/10 min, or of from about 10 g/10 min to about 25 g/10 min (the technique for determining melt index as used herein is described in ASTM D-1238, 2.16 kg, 190° C.);

b) a melt elastic modulus G' (G"=500 Pa) at 170° C. below 15 Pa (the technique for determining melt elastic modulus as used herein is described in WO 2005/019333);

c) a relaxation time lambda at 170° C. below 0.003 s;

d) at least two second melt temperature peaks between 110° C. and 120° C. The technique for determining melt temperature peaks as used herein is based on ASTM D-3417/D3418. In such a technique, non-hermetic TZero pans from TA instruments and a target sample weight of 3.5 mg (that has been conditioned in a controlled lab at 23° C.±2° C.) can be utilized, the enthalpies can be determined by linear integration, and a TA Q2000 DSC can be utilized. An example DSC method for determining melt temperature peaks of polyethylene can include: equilibrium at 150° C., isothermal for 3 minutes, ramp at 10° C./minute at 0° C., isothermal for 3 minutes, and ramp at 10° C. to 150° C.;

e) a weight average molecular weight (Mw) of from about 10,000 g/mol to about 55,000 g/mol (techniques for determining number average molecular weight (Mn), weight average molecular weight (Mw), and Z average molecular weight (Mz) are described subsequently herein);

f) a molecular weight distribution (Mw/Mn) of from about 2.0 to about 5.0; and g) a Mz/Mw ratio of from about 1.5 to about 2.1.

In certain aspects, the ethylene-based polymer can exhibit a density of about 0.910 g/cm$^3$ or greater (a technique for measuring density is described in ASTM D4703/D1505).

It should be understood that the ethylene-based polymer is not limited to any specific method of preparation. In certain aspects, the ethylene-based polymer can be polymerized in the presence of a single-site catalyst, such as a single-site catalyst comprising a metallocene. Examples of metallocene catalysts, resins, and methods of manufacture are described in U.S. Pat. No. 6,932,592. It is noted that not all ethylene-based metallocene polymers can provide the combination of properties described herein.

In any embodiment, the ethylene based polymer may be what is described herein as a PE1-type polyethylene, a PE2-type polyethylene or a blend of the foregoing.

PE1-Type Polyethylene

Polyethylene referred to hereafter as PE1-type polyethylene comprises ≥50.0 wt. % of polymer units derived from ethylene and ≤50.0 wt % preferably 1.0 wt % to 35.0 wt %, even more preferably 1 wt % to 6 wt % of polymer units derived from a $C_3$ to $C_{20}$ alpha-olefin comonomer (preferably hexene or octene). PE1-type polyethylenes preferably have a composition distribution breadth index (CDBI) of 60.0% or more, preferably 60.0% to 80.0%. The PE1-type polyethylene may have a density of 0.910 to 0.950 g/cm$^3$ (preferably 0.915 to 0.940 g/cm$^3$, preferably 0.918 to 0.925 g/cm$^3$). PE1-type polyethylenes may have a melt index ($I_{2.16}$) according to ASTM D1238 (190° C./2.16 kg) of 1 to 500 g/10 min., particularly 5 to 30 g/10 min. Preferably these polymers are metallocene polyethylenes (mPEs). PE1-type polyethylenes are available from ExxonMobil Chemical Company under the trade name Exceed™ mPEs. Such linear polyethylenes typically have a g'$_{vis}$≥0.95, preferably ≥0.96 and can be a prepared by gas-phase polymerization supported catalyst with a bridged bis(alkyl-substituted dicyclopentadienyl) zirconium dichloride transition metal component and methyl alumoxane cocatalyst.

PE2-Type Polyethylene

Suitable PE2-type polyethylene polymer may be a copolymer of ethylene, and one or more polar comonomers or $C_3$ to $C_{10}$ α-olefins. Typically, the PE2-type polyethylene polymer useful herein includes 99.0 to about 80.0 wt %, 99.0 to 85.0 wt %, 99.0 to 87.5 wt %, 95.0 to 90.0 wt %, of polymer units derived from ethylene and about 1.0 to about 20.0 wt %, 1.0 to 15.0 wt %, 1.0 to 12.5 wt %, or 5.0 to 10.0 wt % of polymer units derived from one or more polar comonomers, based upon the total weight of the polymer. Suitable polar comonomers include, but are not limited to: vinyl ethers such as vinyl methyl ether, vinyl n-butyl ether, vinyl phenyl ether, vinyl beta-hydroxy-ethyl ether, and vinyl dimethylamino-ethyl ether; olefins such as propylene, butene-1, cis-butene-2, trans-butene-2, isobutylene, 3,3,-dimethyl-butene-1,4-methylpentene-1, octene-1, and styrene; vinyl type esters such as vinyl acetate, vinyl butyrate, vinyl pivalate, and vinylene carbonate; halo olefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyano isopropyl acrylate, beta-cyanoethyl acrylate, o-(3-phenylpropan-1,3,-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbo-methoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenyl methacrylamide, N-ethylmaleimide, and maleic anhydride; and other compounds such as allyl alcohol, vinyltrimethylsilane, vinyltriethoxysilane, N-vinylcarbazole, N-vinyl-N-methylacetamide, vinyl dibutyl phosphine oxide, vinyl diphenylphosphine oxide, bis-(2-chloroethyl) vinylphosphonate, and vinyl methyl sulfide.

The PE2-type polyethylene polymer may have a melt index ($I_{2.16}$) as measured according to ASTM D1238, 2.16 kg, 190° C., of 1 to 30.0 g/10 min., particularly 5 to 20 g/10 min.

Polymer Blends

In various aspects, the polymeric coating composition can comprise a polymer blend. In such aspects, the polymer blend can include the ethylene-based polymer blended with a second polymeric component. In certain aspects, the second polymeric component can exhibit a melt index of from about 1 g/10 min to about 30 g/10 min, or of from about 5 g/10 min to about 20 g/10 min. In one or more aspects, the second polymeric component can be a low-density polyethylene; an ethylene acrylic acid co-polymer; an ethyl-methyl acrylate co-polymer; an ethylene-methacrylic acid co-polymer; or a mixture thereof. It should be understood that other blend partners may also be present in the polymer blend, as long as such a polymer blend can achieve a thin coating, e.g., a coat weight of about 15 g/m$^2$ or less at high line speeds, or a coat weight of about 10 g/m$^2$ or less.

In various aspects, the ethylene-based polymer can be present in the polymer blend in an amount of from about 20 wt % to about 80 wt %; of from about 30 wt % to about 70 wt %, or of from about 40 wt % to about 70 wt %. In the same or alternative aspects, the second polymeric component of the polymer blend can be present in an amount of from about 20 wt % to about 80 wt %; of from about 30 wt % to about 70 wt %, or of from about 40 wt % to about 70 wt. %.

In certain aspects, the polymeric coating composition includes the ethylene-based polymer in the absence of a second polymeric component. In such aspects, the ethylene-based polymer can be present in an amount of at least about 70 wt %, at least about 90 wt %, at least about 95 wt %, or at least about 99 wt %.

In various aspects, the polymeric coating composition can optionally include one or more additives. The additives can include fillers, such as inorganic fillers, antioxidants, anti-cling additives, UV stabilizers, heat stabilizers, plasticizers, anti-blocking agents, release agents, anti-static agents, pigments, colorants, dyes, waxes, silica, processing aides, and the like. The additives can be present in the polymeric composition in an amount of less than about 15 wt %, less than about 10 wt %, or less than about 8 wt %.

In one aspect, the additive comprises an inorganic filler, such as talc, $CaCO_3$, or a mixture thereof. In such an aspects, the inorganic filler can facilitate the processing, e.g., the cutting, of a film or coating layer formed from the polymeric coating composition.

As discussed above, the polymer coating composition can be a thin film composition having a coat weight of about 15 $g/m^2$ or less, about 13 $g/m^2$ or less, about 12 $g/m^2$ or less, about 10 $g/m^2$ or less, about 8 $g/m^2$ or less, or about 5 $g/m^2$ or less.

In various aspects, the polymeric coating composition can be formed utilizing any conventional equipment and methods of preparation, including dry compositing the individual components together and subsequently melting in a mixer, or by mixing the individual components directly into a mixer (e.g., a Banbury mixer or a dry mixer), or into a single- or twin-screw extruder (which can include a compounding extruder and/or a side arm extruder used downstream of a polymerization process or on-line blending at a converter operation).

Coated Articles

As discussed above, in certain aspects, coated articles are described that include a substrate coated with at least one layer of the polymeric coating compositions described above. In certain aspects, the substrate comprises a fibrous substrate, such as paper or paperboard. It should be understood that substrates other than fibrous substrates are also contemplated, such as metal and/or plastic substrates.

The coated articles described herein can be used as a container for food, beverages, cosmetics, or other products. Example coated articles, include a disposable beverage cup, cosmetic cream or lotion container, ice cream container, to-go food container, and the like.

In various aspects, the coated article can include one, two, three, or more layers coated onto one or more surfaces of the substrate. As discussed further below, the composition and/or the coat weight of each layer may differ depending upon whether such a layer is a single layer in a single layer coated article, or whether a layer is one of multiple layers on a coated article. For ease of description, the foregoing is with reference to the coated article designed as a food or beverage container; however, the same or similar properties discussed in this section may also apply for coated articles designed for uses other than food or beverage containers.

In aspects, where the coated article is a single layer coated article, the single layer comprises a polymer blend as described above with reference to the polymeric coating compositions. As discussed above, the polymeric coating compositions exhibit specific processing properties that facilitate the efficient and effective coating of a substrate at high line speeds and at a low coat weight, e.g., about 15 $g/m^2$ or less, about 10 $g/m^2$ or less, about 8 $g/m^2$ or less, or about 5 $g/m^2$ or less. In aspects, the ethylene-based polymer component of the blend can provide the desired processing and sealing properties, while the second polymeric component of the polymer blend offers good balance between processability and end use performances.

Unexpectedly, the single layer polymeric coating, while present in a thin layer at a lower coat weight compared to conventional coated articles, exhibits enhanced seal strength. For instance, when the coated article includes at least one sealed seam that is sealed via the single layer polymeric coating, the sealed seam has a seal strength of at least about 6 N/15 mm, at least about 7 N/15 mm, or at least about 8 N/15 mm. The seal strength can be measured as discussed further below with reference to the Examples.

In various aspects, the single layer polymeric coating can be present on both (opposing) surfaces of the substrate. In alternative aspects, the single layer polymeric coating can be present on the food- and/or beverage-contacting side of the coated article, with the opposing surface of the substrate uncoated.

As discussed above, in alternative aspects, the coated articles can include at least two polymeric coating layers on the substrate. For instance, a first polymeric coating layer can be secured to one surface of the substrate, while a second polymeric coating layer can be secured to the first polymeric layer, such that the first polymeric layer is positioned between the surface of the substrate and the second polymeric coating layer. In such aspects, the first polymeric coating layer secured to the substrate functions as a "tie" layer and can provide adhesion to the substrate, while the second polymeric coating layer secured to the first polymeric coasting layer functions as the "seal" layer, to provide a barrier between the beverage or food and the substrate, and/or to form a sealed seam in the coated articles.

In certain aspects, the first polymeric layer can include one or more functionalized co- or ter-polymers, or a homopolymer or a copolymer. A non-limiting list of example functionalized co- or ter-polymers includes ethylene acrylic acid co-polymers (EAA), such as ExxonMobil Escor™, ethyl-methyl acrylate co-polymers (EMA), such as ExxonMobil Optema™ resins, ethylene n-butyl acrylate copolymers (EnBA), such as ExxonMobil EnBA™ resins, or maleic anhydride functionalized polyolefins (homopolymer or co-polymer), such as ExxonMobil Exxelor™ resins. In various aspects, the homopolymer or co-polymer in the first polymeric layer can include ethylene homopolymers and/or ethylene co-polymers, including ethylene-hexene co-polymers, or other alpha-olefin co-polymers. Such ethylene homopolymers and/or ethylene co-polymers can generally be referred to as ethylene based polymers.

In aspects, the first polymeric layer is selected to provide sufficient adhesion to the substrate. In such aspects, this adhesive tie layer is coated at a relatively low coat weight, such as about 7 $g/m^2$ or less, or about 5 $g/m^2$ or less.

In aspects, the second polymeric layer includes the polymeric coating compositions described above. For instance, in such aspects, the second polymeric layer can include the ethylene-based polymer described above, alone or in the polymer blend described above.

The second polymeric layer can be present in a coat weight of about 15 g/m² or less, about 13 g/m² or less, about 12 g/m² or less, about 10 g/m² or less, about 8 g/m² or less, or about 5 g/m² or less, which is a reduced coat weight for a seal layer (and food-contacting layer) compared to conventional seal layers. It has been unexpectedly discovered that the second polymer layer at this reduced coat weight can exhibit sufficient or enhanced seal strength, when at least a portion of the coated substrate is formed into a sealed seam. For instance, coated articles comprising the first and second polymeric layers, as described herein, can have a sealed seam with a seal strength of at least about 6 N/15 mm, at least about 7 N/15 mm, or at least about 8 N/15 mm.

In one or more aspects, the coated article can include a third polymeric layer on one or both sides of the article. In certain aspects, the third polymeric layer can be secured to the second polymeric layer and opposite the first polymeric layer. In aspects, the third polymeric layer can have the same parameters as other polymeric layers discussed above. In various aspects where the coated article includes three polymeric layers, each of the three polymeric layers can have the same or similar polymeric composition.

Methods of Forming the Coated Articles

The coated articles can be made according to any conventional methods. For example, the coated articles can be made via extrusion coating, co-extrusion coating, and lamination processes known to those of skill in the art. In aspects where the coated articles includes a polymeric coating on both opposing sides of the substrate, the substrate may be coated on a first side via extrusion coating or co-extrusion coating prior to coating on the second side.

In various aspects, as discussed above, the coated article may include a sealed seam, which can be sealed via the polymeric coating compositions. In such aspects, one end of the coated article can be sealed to another end of the coated article, to a portion of a separate substrate (coated or uncoated), or a combination thereof. In such aspects, the coated article may be exposed to thermal energy in order to facilitate the formation of the sealed seam. It should be understood that depending upon the desired article, any number of sealed seams may be present in the coated article. Any conventional equipment or methods can be used to form the articles into final coated articles.

Molecular Weight Test Method

The distribution and the moments of molecular weight (Mw, Mn, Mw/Mn, etc.), are determined by using a high temperature Gel Permeation Chromatography (Polymer Char GPC-IR) equipped with a multiple-channel band-filter based infrared detector IR5, an 18-angle light scattering detector and a viscometer. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 mL/min and the nominal injection volume is 200 μL. The whole system including transfer lines, columns, detectors are contained in an oven maintained at 145° C. Given amount of polymer sample is weighed and sealed in a standard vial with 80 μL flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples.

The concentration (c), at each point in the chromatogram is calculated from the baseline-subtracted IR5 broadband signal intensity (I), using the following equation:

$$c = \beta I.$$

where $\beta$ is the mass constant determined with PE standards. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M. The MW at each elution volume is calculated with following equation:

$$\log M = \frac{\log(K_{PS}/K)}{a+1} + \frac{a_{PS}+1}{a+1} \log M_{PS},$$

where the variables with subscript "PS" stands for polystyrene while those without a subscript are for the test samples. In this method, $a_{PS}=0.67$ and $K_{PS}=0.000175$ while a and K are calculated from a series of empirical formula established in ExxonMobil and published in literature (T. Sun, P. Brant, R. R. Chance, and W. W. Graessley, Macromolecules, Volume 34, Number 19, pp. 6812-6820, (2001)). Specifically, a/K=0.695/0.000579 for PE. The parameters used for the data processing are:
Nominal MHK=0.000534, Nominal MHa=0.695; dn/dc=0.1048 mL/mg; A2=0.00150.

All the concentration is expressed in g/cm³, molecular weight is expressed in g/mole, and intrinsic viscosity is expressed in dL/g unless otherwise noted.

Examples—Thin Film Polymer Components

In the following examples, various thin layer polymer coatings and combinations of such thin layer polymer coatings are described. The thin layer polymer coatings correspond coatings including one or more of the following types of polymers.

Low Density Polyethylene A (LDPE A) represents a commercially available low density polyethylene resin. LDPE A has a melt index of 8.2 g/10 min and a peak melting temperature of 106° C. LDPE A does not have second melt temperature peaks between 110° C. and 120° C. Among other applications, LDPE A is traditionally used as a coating for applications where water vapor good organoleptic properties are desirable.

Low Density Polyethylene B (LDPE B) represents another commercially available low density polyethylene coating. LDPE B has a melt index of 5.0 g/10 min and a peak melting temperature of 105° C. Among other applications, LDPE B is traditionally used for low speed extrusion coating and its low neck-in property. LDPE B also has good organoleptic properties.

Copolymer C is a commercially available ethylene-acrylic acid copolymer resin. Copolymer C has a melt index of 8.2 g/10 min, a peak melting temperature of 102° C., and a melt elastic modulus G' (G"=500 Pa) at 170° C. of greater than 15 Pa. Copolymer C also has a weight average molecular weight (Mn) outside the range of the weight average molecular weight (Mn) of the ethylene-based polymers discussed above. Among other applications, Copolymer C is traditionally used for extrusion coating and co-extrusion coating, and has good adhesion characteristics to a variety of surfaces.

Ethylene-based Polymer 1 (EB Polymer 1) is a commercially available metallocene ethylene-hexene copolymer. Among other applications, EB Polymer 1 is traditionally used for extrusion coating and co-extrusion coating processes. EB Polymer 1 has a melt index of ~19 g/10 min. EB Polymer 1 also has a melt elastic modulus G' at 170° C. of about 6.7 Pa, a relaxation time lambda at 170° C. below 0.003 seconds, at least two second melt temperature peaks between 112° C. and 115° C., a weight average molecular weight of 25,000 g/mol, a molecular weight distribution ($M_w/M_n$) of 2.5, and a $M_z/M_w$ ratio of 1.7. It has been unexpectedly discovered that EB Polymer 1 can provide superior properties for sealing and bonding when used in coating layers that are thinner than conventional coating layers.

Ethylene-based Polymer D (EB Polymer D) is another commercially available metallocene ethylene-hexene copolymer with good tensile properties and impact and puncture toughness. EB Polymer D has a melt index of ~3.5 g/10 minutes.

As used herein, "lambda relaxation time" is calculated by dynamic frequency scan at 170° C. using an ARES rotational rheometer in a nitrogen atmosphere, using a plate-plate geometry with a 25 mm diameter. Strain is maintained at less than or equal to 10% and frequency is varied between 100 rad/s and 0.2 rad/s with 5 points measured per decade. Dynamic moduli (i.e., storage modulus, G', and loss modulus, G") are recorded and the norm complex viscosity is calculated according to the following Equation 1:

$$\eta^*\omega = G'2 + G''2\omega \qquad \text{Equation 1.}$$

The norm of the complex viscosity is then fitted with a Cross model according to the following Equation 2:

$$\eta^*\omega = \eta 01 + \lambda\omega 1 - n \qquad \text{Equation 2,}$$

where η0 is the zero-shear viscosity, λ is the average relaxation time, and n is the shear thinning index.

In the Tables that follow, the term "Coat Weight" refers to the thickness of the polymeric coating expressed as the weight in grams of the polymeric coating composition per square meter ($g/m^2$).

In the Tables that follow, the "Speed (meters/min)" refers to the speed of the laminator, or the extrusion coating line, where the polymeric coating composition is applied to the substrate and is expressed in meters per minute (meters/min).

The coated paper samples described and analyzed in the Tables below were made according to the following procedure. The mono and co-extrusion coatings were applied using 2.5 inch and 3.5 inch extruders, 28:1 L/D. The 750 mm diameter roll used had a matte finish and was held as cold as possible through the runs. The paper substrate was 70 grams per square meter ($g/m^2$) Kraft paper, which was corona treated on line prior the coating. The air gap was maintained at 170 mm.

In the Tables that follow, the "Seal Strength Test" refers to the sealing of a sample and the measurement of the strength of that seal. The sample sealing procedure is based on ASTM F2029. First, the paper substrate is coated at a particular Speed and Coat Weight, with the coating compositions specified in the Tables. The heat seal is prepared under standard lab conditions. The sealing conditions include a 5 mm seal bar with a smooth surface, a time of 0.5 seconds, and a pressure of 500 N. The heat seal is performed at several temperatures such as 90-100° C., 110° C., or 120° C. The sealed samples are conditioned in a constant temperature laboratory for at least 40 hours at 23° C.+/−2° C. and at 50%+/−relative humidity. The heat seal force is tested based on ASTM F88. Each tail of the sealed specimen is secured in opposing grips 20 mm apart and the seal remains unsupported while the test is being conducted. The test speed for measuring the heat seal force is 100 meters/min. A Zwick machine, cell of 100 N gives the average heat seal force expressed as "N/15 mm".

In the Tables that follow, the "T-Peel Test" refers to the force required to peel apart a seal formed between a portion of a paper cup and a 70 $g/m^2$ paper substrate, which has been coated with the coating composition specified in the Tables. The samples are prepared by cutting a paper cup to flatten out the side wall of the cup. A Kopp heat sealer is used to seal together the flattened-outside wall of the cup and the paper substrate using a 20 mm seal bar with a smooth surface, at a pressure of 1600 N, for 1 second. The seals are formed at the temperature specified in the Tables. The sealed samples are conditioned in a constant temperature laboratory for at least 40 hours at 23° C.+/−2° C. and at 50%+/−relative humidity. The sealed samples are then cut into at least five 15 mm strips with a sample cutter. The 15 mm strip is then partly pulled apart and the pulled apart ends are held in place by clamps positioned 20 mm apart in a Zwick machine with a cell of 100 N and flat inserts. The Zwick machine then measures the force required to pull apart the remaining sealed portion. The Zwick machine gives the average heat seal force expressed as "N/15 mm".

In the Tables that follow, the "Neck-in" refers to the reduction in the polymeric coating width when extruded at 35 min output onto paper at 25, 50, 100, and 200 meters per minute line speeds.

Examples—Properties of Thin Single Layer Polymer Coating Compositions at Coat Weights of 10 $g/m^2$ or Less Tables 1a, 1b, and 1c below show various samples made using various compositions at a coat weight of 5 $g/m^2$. The coatings shown in Tables 1a, 1b, and 1c were applied at various laminator line speeds (in meters per minute (m/min)) during the extrusion coating process. The coatings in Tables 1a, 1b, and 1c represent coatings applied to a 70 gsm paper substrate.

Table 1a shows examples of 5 polymer coatings at a coating weight of 5 $g/m^2$. Columns 1 and 2 correspond to polymer coatings based on LDPE A coated at laminator line speeds of 100 m/min and 300 m/min. Columns 5, 6, and 7 correspond to polymer coatings based on a polymer blend of LDPE B (20 wt %) and EB Polymer 1 (80 wt %) at laminator line speeds of 100 m/min, 300 m/min, and 500 m/min.

In Table 1a and 1b, the columns numbered 1 and 2 correspond to coating layers using a conventional low density polyethylene in the form of LDPE A. Coat weights of 5 $g/m^2$ added at laminator line speeds of 100 m/min and 300 m/min. The highest seal strength observed was less than 5.0. By contrast, the coating layers with a blend of EB Polymer 1 and LPDE B (Columns 5 and 6) or a blend of EB Polymer 1 and LPDE A (Columns 10 and 11) have increased seal strength of greater than 5.0, or greater than 6.0, at sealing temperatures of 110° C. and/or 120° C. As expected, seal strength is impacted by the extrusion line speed, combined effect of adhesion, and polymer residence time in the air gap.

TABLE 1a

|  | 1 | 2 | 5 | 6 | 7 |
|---|---|---|---|---|---|
| LDPE A | 100% | 100% |  |  |  |
| LDPE B |  |  | 20% | 20% | 20% |
| EB Polymer 1 |  |  | 80% | 80% | 80% |
| EB Polymer D |  |  |  |  |  |
| Copolymer C |  |  |  |  |  |
| Coat weight (g/m$^2$) | 5 | 5 | 5 | 5 | 5 |
| Speed (meters/min) | 100 | 300 | 100 | 300 | 500 |
| Seal strength |  |  |  |  |  |
| 110° C. | 4.6 | 4.4 | 6.1 | 4.5 |  |
| 120° C. | 4.9 | 4.7 | 6.6 | 5.3 |  |
| T-Peel Test (cup-paper) |  |  |  |  |  |
| 110° C. | 0.4 | NA | — | — | — |
| 120° C. | 1.2 | NA | — | — | — |

Table 1b shows results from additional blends of EB Polymer 1 with a traditional low density polyethylene (LDPE A). Similar to the blends in Columns 5 and 6 of Table 1a, the coating layers with a blend a blend of EB Polymer 1 and LPDE A (Columns 10 and 11) have increased seal strength of greater than 5.0, or greater than 6.0, at sealing temperatures of 110° C. and/or 120° C.

Table 1b also shows results for coatings including a blend of three polymers. Column 14 shows a blend of LDPE A, EB Polymer 1, and Copolymer C. As shown in Table 1b, incorporating the ethylene-acrylic acid copolymer into the blend resulted in a layer that did not adhere to the paper substrate. This is due to the fact that the actual extrusion temperature is limited to stay below 300° C. when working with an acid copolymer. Columns 17, 18, and 19 show results from blends of LDPE A, EB Polymer 1, and ED Polymer D. These columns show that the benefits of EB Polymer 1 for thin coating layers are maintained when a portion of an ethylene copolymer with a low melt index is included in the blend, but lower strengths are achieved. Similar to the results in Table 1a, increasing the laminator speed impacts the seal strength.

TABLE 1b

|  | 10 | 11 | 14 | 17 | 18 | 19 |
|---|---|---|---|---|---|---|
| LDPE A | 20% | 20% | 20% | 20% | 20% | 20% |
| LDPE B |  |  |  |  |  |  |
| EB Polymer 1 | 80% | 80% | 60% | 60% | 60% | 60% |
| EB Polymer D |  |  |  | 20% | 20% | 20% |
| Copolymer C |  |  | 20% |  |  |  |
| Coat weight (g/m$^2$) | 5 | 5 | 5 | 5 | 5 | 5 |
| Speed (meters/min) | 100 | 300 | 100 | 100 | 300 | 500 |
| Seal strength |  |  | No adhesion to paper |  |  |  |
| 110° C. | 6.8 | 3.9 |  | 6.3 | 4.8 | 3.4 |
| 120° C. | 6.9 | 6.2 |  | 6.1 | 6.5 | 4.5 |
| T-Peel Test (cup-paper) |  |  |  |  |  |  |
| 110° C. | 0.6 | <0.2 | — | 0.4 | <0.2 | <0.2 |
| 120° C. | 1.8 | 0.4 | — | 1.3 | 0.3 | 1.1 |

Table 1c shows results for blends of three polymers with an increased amount of EB Polymer D. As shown in Table 1c, the higher amount of EB Polymer D in Columns 22, 23, and 24 resulted in lower seal strength at each laminator line speed coating relative to the comparable coatings having only 20 wt % of EB Polymer D, as shown in Columns 17, 18, and 19 of Table 1b. These results are due to the fact that the EB Polymer D does not have the specific flow behavior as exhibited in the EB Polymer 1.

TABLE 1c

|  | 22 | 23 | 24 |
|---|---|---|---|
| LDPE A | 20% | 20% | 20% |
| LDPE B |  |  |  |
| EB Polymer 1 | 40% | 40% | 40% |
| EB Polymer D | 40% | 40% | 40% |
| Copolymer C |  |  |  |
| Coat weight (g/m$^2$) | 5 | 5 | 5 |
| Speed (meters/min) | 100 | 300 | 500 |
| Seal strength |  |  |  |
| 110° C. | 5.5 | 2.5 | 2.1 |
| 120° C. | 6.3 | 4.8 | 3.6 |

Tables 2a-2c provide data from tests similar to those shown in Tables 1a-1c, but based on coating layers formed at a coat weight of 10 g/m$^2$, instead of the 5 g/m$^2$ data shown in Tables 1a-1c. In Table 2a, Columns 3 and 4 are directed to polymer coatings similar to those in Columns 1 and 2 from Table 1a, but at the higher coat weight of 10 g/m$^2$. The coatings in Columns 8 and 9 are also similar to Columns 5 and 6 of Table 1a. As shown in Table 2a, the unexpected benefit of using a coating containing EB Polymer 1 is maintained at the increased coat weight of 10 g/m$^2$.

TABLE 2a

|  | 3 | 4 | 8 | 9 |
|---|---|---|---|---|
| LDPE A | 100% | 100% |  |  |
| LDPE B |  |  | 20% | 20% |
| EB Polymer 1 |  |  | 80% | 80% |
| EB Polymer D |  |  |  |  |
| Copolymer C |  |  |  |  |
| Coat weight (g/m$^2$) | 10 | 10 | 10 | 10 |
| Speed (meters/min) | 100 | 300 | 100 | 300 |
| Seal strength |  |  |  |  |
| 110° C. | 5.9 | 5.2 | 6.9/ | 5.1 |
| 120° C. | 6.1 | 4.8 | 7.3 | 6.3 |

TABLE 2a-continued

|  | 3 | 4 | 8 | 9 |
|---|---|---|---|---|
| T-Peel Test (cup-paper) |  |  |  |  |
| 110° C. | 0.7 | <0.2 | — | — |
| 120° C. | 3.8 | 1.7 | — | — |

Columns 12 and 13 in Table 2b shows results for coatings similar to those in Columns 10 and 11 of Table 1b. In addition to providing similar advantages for increased seal strength, the coating in Column 13 also provides the advantage at 120° C. of maintaining the sealing on cup at the higher laminator speed of 300 meters per minute. This is in contrast to the result in Column 4, where increasing the line speed to 300 meters per minute for a conventional low density polyethylene polymer at a coat weight of 10 g/m² results in a substantial lowering of the sealing on cup value.

TABLE 2b

|  | 12 | 13 |
|---|---|---|
| LDPE A | 20% | 20% |
| LDPE B |  |  |
| EB Polymer 1 | 80% | 80% |
| EB Polymer D |  |  |
| Copolymer C |  |  |
| Coat weight (g/m²) | 10 | 10 |
| Speed (meters/min) | 100 | 300 |
| Seal strength |  |  |
| 100° C. | 5.5 | 4.1 |
| 110° C. | 7.0 | 5.8 |
| 120° C. | 7.8 | 7.1 |
| T-Peel Test (cup-paper) |  |  |
| 110° C. | 1.2 | <0.2 |
| 120° C. | 3.4 | 3.6 |

In Table 2c, Columns 20 and 21 correspond to a polymer coating similar to the coating in Columns 17 and 18 of Table 1b. At sealing temperatures of 110° C. or 120° C. and laminator line speeds of 100 meters per minute. Column 20 appears to provide an improved seal strength relative to Column 3. However, this advantage appears to be removed at the higher line speed of 300 meters per minute. The polymer blends with increased content of EB Polymer D in Columns 25 and 26 appear to show similar behavior.

TABLE 2c

|  | 20 | 21 | 25 | 26 |
|---|---|---|---|---|
| LDPE A | 20% | 20% | 20% | 20% |
| LDPE B |  |  |  |  |
| EB Polymer 1 | 60% | 60% | 40% | 40% |
| EB Polymer D | 20% | 20% | 40% | 40% |
| Copolymer C |  |  |  |  |
| Coat weight (g/m²) | 10 | 10 | 10 | 10 |
| Speed (meters/min) | 100 | 300 | 100 | 300 |
| Seal strength |  |  |  |  |
| 110° C. | 6.6 | 5.1 | 6.3 | 3.2 |
| 120° C. | 6.9 | 5.9 | 7.4 | 4.2 |
| T-Peel Test (cup-paper) |  |  |  |  |
| 110° C. | 0.6 | <0.2 | — | — |
| 120° C. | 3.2 | 0.4 | — | — |

Figure 4:
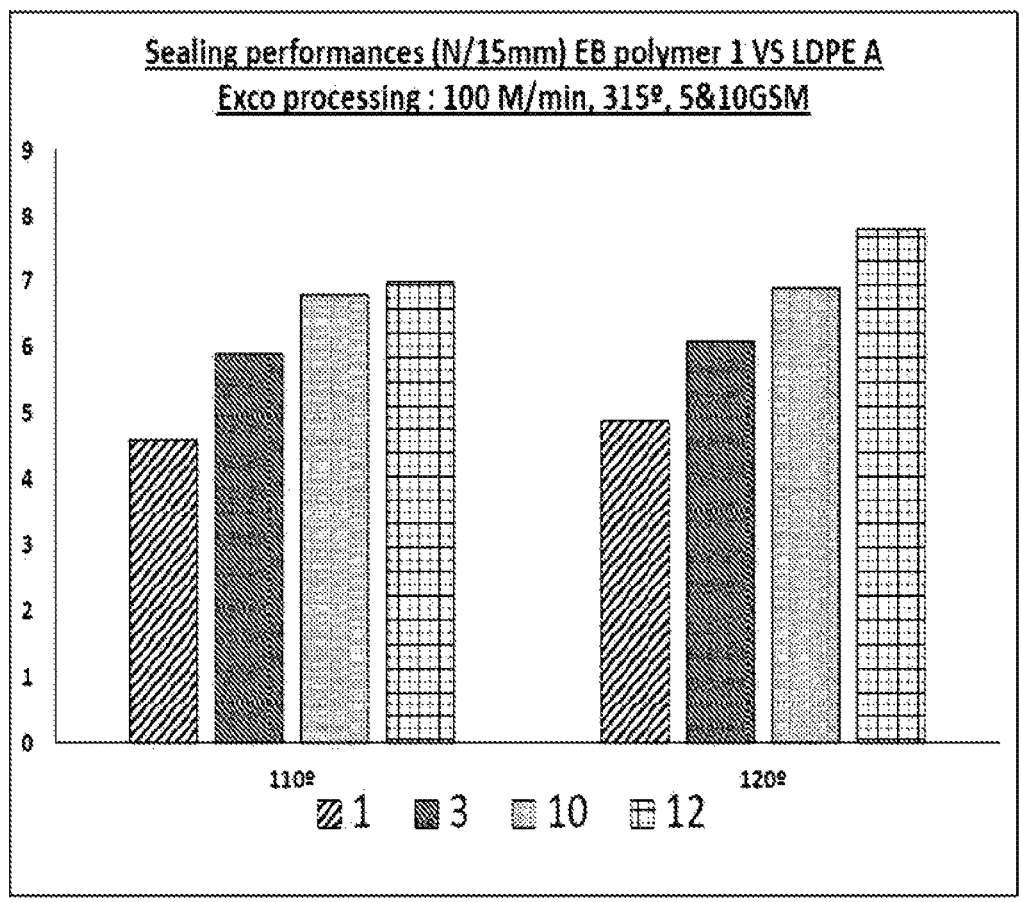
FIG. 4 shows the results of the Seal Strength Test on paper substrates extrusion coated with various polymeric coating compositions, where the coating process was performed at a laminator line speed of 100 meters/min and a set temperature of 315° C.

Tables 1a-1c above focus on data from layers with a coat weight of 5 g/m², while Tables 2a-2c focus on data from layers with a coat weight of 10 g/m². In order to better illustrate the benefits of using a polymer coating that includes 20 wt % to 80 wt % of a polymer such as EB Polymer 1, FIG. 4 combines seal strength data from various columns in Tables 1a and 1b, and Tables 2a and 2b. In FIG. 4, two sets of bar graphs are shown. The bar graphs on the left side of FIG. 4 correspond to seal strength for seals formed at 110° C., while the bar graphs on the right side of the figure correspond to seal strength for seals formed at 120° C. Within each group of bars, the left-most bar corresponds to the coating from Column 1 of Table 1a; the next bar corresponds to Column 3 from Table 2a; the next bar corresponds to Column 10 from Table 1b; and the right-most bar corresponds to Column 12 from Table 2b.

As shown in FIG. 4, the coating layer including EB Polymer 1 at a coat weight of 5 g/m² (Column 10, Table 1b) provides a greater seal strength than the conventional polyethylene coating at a coat weight of 10 g/m² (Column 3, Table 2a). This unexpectedly high sealing strength for a polymer including EB Polymer 1 at a coat weight of only 5 g/m² demonstrates that thinner coating layers can be used while still providing a superior sealing strength for the resulting coated article.

Figure 5:
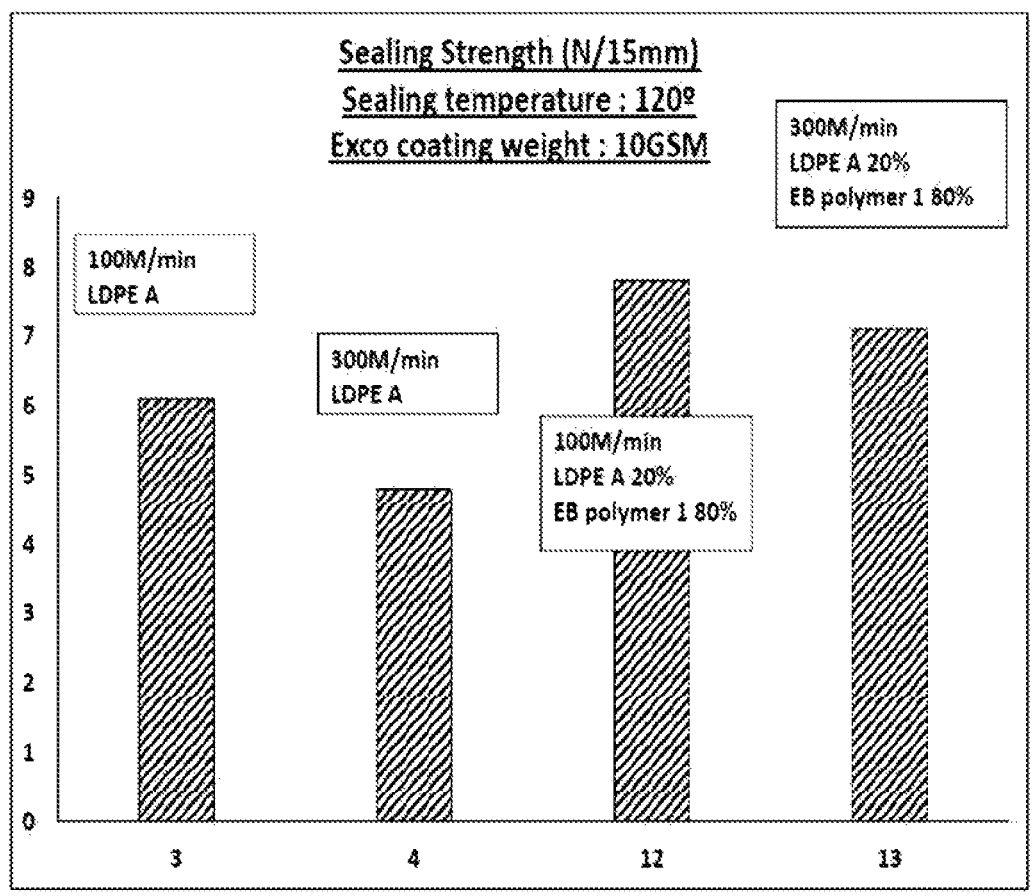
FIG. 5 shows the results of the Seal Strength Test on paper substrates coated with various polymeric coating compositions, where the coating process was performed at a laminator line speed of 100 meters/min and 300 meters/min.

FIG. 5 shows additional comparisons based on Tables 2a and 2b. In FIG. 5, the seal strength for the coatings in Columns 3, 4, 12, and 13 are compared. These coatings correspond to a coat weight of 10 g/m². Columns 3 and 4 correspond to conventional low density polyethylene applied at a laminator line speed of 100 meters per minute or 300 meters per minute, respectively. Columns 12 and 13 correspond to coatings based on 20 wt % of LDPE A and 80 wt % of EB Polymer 1 at line speeds of 100 meters per minute and 300 meters per minute, respectively. As shown in FIG. 5, the seal strength for the coating containing EB Polymer 1, applied at a laminator line speed of 300 meters per minute, provides a superior seal strength relative to conventional polyethylene applied at the slower line speed of 100 meters per minute. This demonstrates the unexpected ability of polymer blends including a polymer having the characteristics of EB Polymer 1 to provide desirable seal strengths at higher than expected laminator line speeds.

Figure 3:
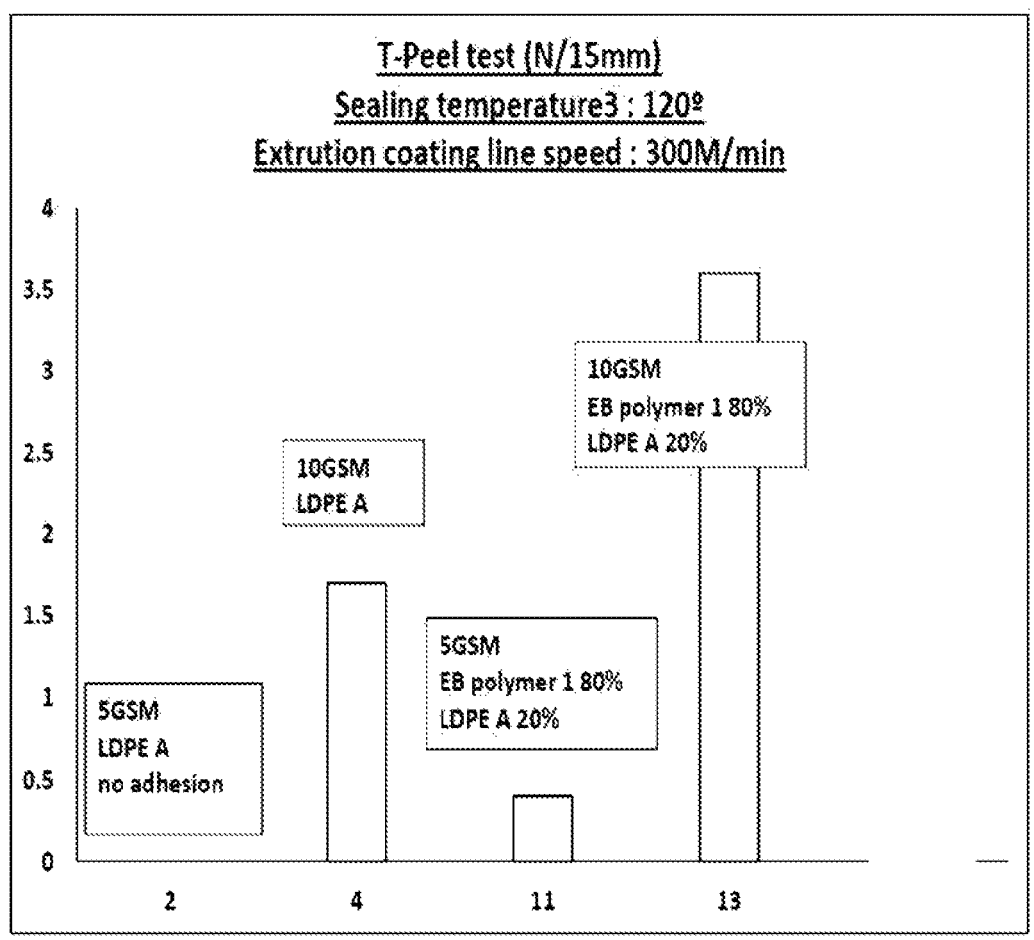
FIG. 3 shows the results of the Seal Strength Test on paper substrates extrusion coated with various polymeric coating compositions, where the coating process was performed at a laminator line speed of 300 meters/min and a set temperature of 315° C.

Use of polymer blends including a polymer having the properties of EB Polymer 1 can also provide benefits for the sealing force, as shown in FIG. 3. FIG. 3 shows the seal force (in Newtons per 15 mm) for sealing a coating to a paper substrate at a line speed of 300 meters per minute, a set temperature of 315° C., and a sealing temperature of 120° C. FIG. 3 includes this data on the layers corresponding to Column 2 of Table 1a, Column 4 of Table 2a, Column 11, Table 1b, and Column 13 of Table 2b.

As shown in FIG. 3, conventional low density polyethylene does not form a seal at a coat weight of 5 g/m² under these conditions, while the polymer blend including EB Polymer 1 does provide a seal. At a coat weight of 10 g/m², the polymer blends including EB Polymer 1 in various amounts provided substantially higher seal force values than the corresponding low density polyethylene coating.

Examples—Properties of Polymer Coating
Compositions at Coat Weights of 15 g/m² to 20
g/m²

Tables 3a-3b and Tables 4a-4c provide properties for polymer coating layers made at net coating weights of 15 g/m² and 20 g/m². The coatings in Tables 3a and 3b correspond to single coating layers of a polymer or polymer blend. The coatings in Tables 4a-4c correspond to coatings that include two coating layers. For the coatings including two coating layers, Extrusion B corresponds to the layer in contact with the paper substrate used for supporting the coating layers. Extrusion A corresponds to the coating layer that is exposed at the surface of the coating.

Table 3a and Table 3b provide properties for single layer coatings at a coat weight of either 15 g/m² or 20 g/m² for various combinations of Copolymer C, EB Polymer 1, and LDPE A. In Tables 3a and 3b, either Copolymer C would appear to be the strongest candidate for further investigation into coating at reduced coating weights. At a coat weight of 15 g/m², Copolymer C provided the highest seal strength, the highest sealing on cup values, and the lowest neck-in values. LDPE A performs less well at the higher coat weight of 20 g/m² (Column 4). The blends of 80 wt % EB Polymer 1 and 20 wt % LDPE A perform well at coating thicknesses of 20 g/m² (Column 3) but less well at 15 gsm (Column 2). The blends of 30 wt % EB Polymer 1 with 70 wt % LDPE A (Columns 7 and 9) had slightly higher neck-in values comparable to the Copolymer C or LDPE A single layers while providing only comparable sealing strength. The polymer blend of Copolymer C and EB Polymer 1 exhibited a relatively high seal strength at a sealing temperature of 110° C. However, the coating in Column 8 had a still higher neck-in value than the blends of EB Polymer 1 and LDPE A in Column 3. As a result, this blend is not a preferred option.

TABLE 3a

| | 1 | 2 | 3 | 4 |
|---|---|---|---|---|
| Ext A | | | | |
| Copolymer C | 100% | | | |
| EB Polymer 1 | | 80% | 80% | |
| LDPE A | | 20% | 20% | 100% |
| Coat weight (g/m²) | 15 | 15 | 20 | 20 |
| T-Peel Test (cup-paper) | | | | |
| 130° C. Seal strength | 3.5 | 2.6 | 3.5 | 3.4 |
| 100° C. | 9.4 | 7.7 | 10.7 | 5.9 |
| 110° C. | 9.2 | 8.3 | 10.0 | 6.3 |
| Neck-in measurement(mm) | 50 | 185 | 170 | 45 |
| Final coating width Working paper width: 500 mm | 450 | 315 | 330 | 455 |

TABLE 3b

| | 6 | 7 | 8 | 9 |
|---|---|---|---|---|
| Ext A | | | | |
| Copolymer C | 100% | | 20% | |
| EB Polymer 1 | | 30% | 80% | 30% |
| LDPE A | | 70% | | 70% |
| Coat weight (g/m²) | 20 | 15 | 20 | 20 |
| T-Peel Test (cup-paper) | | | | |
| 130° C. Seal strength | 3.2 | 3.7 | 3.4 | 3.9 |
| 100° C. | 9.8 | 6.9 | 2.0 | 8.6 |
| 110° C. | 11.5 | 7.6 | 10.5 | 9.4 |
| Neck-in measurement(mm) | 45 | 55 | 265 | 60 |
| Final coating width Working paper width: 500 mm | 455 | 445 | 235 | 440 |

Based on the results shown in Tables 3a and 3b, polymer blends of EB Polymer 1 with Copolymer C and/or of EB Polymer 1 with LDPE A would appear to be less favorable than other types of coatings at coat weights of 15 g/m² or more. However, the beneficial properties of polymer blends including a polymer with properties similar to EB Polymer 1 can be achieved by using a two layer coating, with one of the layers corresponding to a polymer blend containing EB Polymer 1 (or polymer with similar properties).

Tables 4a-4c shows results from characterization of coatings that included two separate layers (such as co-extruded layers) at a total coat weight of either 15 g/m² or 20 g/m². As shown in Table 4a, addition of a tie layer (Extrusion B) of EB Polymer 1 did not generally lead to an improvement in seal strength and/or other properties. But this data confirms the better sealing/adhesion onto the cupboard when using copolymer C and/or a blend of EB Polymer 1 with copolymer C as the sealant versus using LDPE (LDPE A).

TABLE 4a

| | 20 | 21 | 22 | 23 |
|---|---|---|---|---|
| Ext A | | | | |
| Copolymer C | 100% | 100% | | |
| EB Polymer 1 | | | | |
| LDPE A | | | 100% | 100% |
| Coat weight (g/m²) | 10.5 | 14 | 10.5 | 14 |
| Ext B | | | | |
| Copolymer C | | | | |
| EB Polymer 1 | 100% | 100% | 100% | 100% |
| Coat weight (g/m²) | 4.5 | 6 | 4.5 | 6 |
| Total coat weight (g/m²) | 15 | 20 | 15 | 20 |
| T-Peel Test (cup-paper) | | | | |
| 130° C. Seal strength | 3.5 | 3.6 | 1.4 | 0.9 |
| 100° C. | 3.2 | 4.2 | — | — |
| 110° C. | 4.4 | 5.5 | — | — |
| Neck-in measurement | 45 | 50 | 55 | 55 |
| Final coating width Working paper width: 500 mm | 455 | 450 | 445 | 445 |

In Columns 26 and 27, a tie layer of Copolymer C was used in combination with a top layer of LDPE A. Based on the relatively low T-Peel test values, the coating in Columns 26 and 27 resulted in a less favorable seal characteristics.

TABLE 4b

| | 24 | 25 | 26 | 27 |
|---|---|---|---|---|
| Ext A | | | | |
| Copolymer C | 20% | 20% | | |
| EB Polymer 1 | 80% | 80% | | |
| LDPE A | | | 100% | 100% |
| Coat weight (g/m²) | 10.5 | 14 | 10.5 | 14 |
| Ext B | | | | |
| Copolymer C | | | 100% | 100% |
| EB Polymer 1 | 100% | 100% | | |
| Coat weight (g/m²) | 4.5 | 6 | 4.5 | 6 |
| Total coat weight (g/m²) | 15 | 20 | 15 | 20 |
| T-Peel Test (cup-paper) | | | | |
| 130° C. Seal strength | 2.9 | 3.3 | 0.5 | 0.4 |
| 100° C. | 2.8 | 1.4 | — | — |

TABLE 4b-continued

|  | 24 | 25 | 26 | 27 |
|---|---|---|---|---|
| 110° C. | 5.5 | 5.7 | — | — |
| Neck-in measurement(mm) | 345 | 255 | 35 | 35 |
| Final coating width Working paper width: 500 mm | 155 | 245 | 465 | 465 |

Additional combinations of tie layers and top layers are shown in Table 4c. For top layers including a blend of EB Polymer 1 and LDPE A, the choice of tie layer resulted in different neck-in values, but the T-Peel strength values were comparable for each of Columns 11, 28, and 29.

An unexpectedly different behavior was discovered when a tie layer of Copolymer C was used with a blend of EB Polymer 1 and Copolymer C as the top layer. Column 30 corresponds to a total coat weight of 15 g/m², while Column 31 corresponds to a total coat weight of 20 g/m². This combination of layers resulted in a net coating with a higher seal strength than the Copolymer C coating in Column 1 of Table 3a. The presence of the tie layer also resulted in a reduced neck-in value as compared to the coating in Column 8 of Table 3b or the coatings in Columns 2 and 3 of Table 3a. Based on the unfavorable results shown from other combinations of co-extruded layer, this improvement in properties when using co-extruded layers was unexpected.

TABLE 4c

|  | 11 | 28 | 29 | 30 | 31 |
|---|---|---|---|---|---|
| Ext A |  |  |  |  |  |
| Copolymer C |  |  |  | 20% | 20% |
| EB Polymer 1 | 80% | 80% | 80% | 80% | 80% |
| LDPE A | 20% | 20% | 20% |  |  |
| Coat weight (g/m²) | 14 | 10.5 | 14 | 10.5 | 14 |
| Ext B |  |  |  |  |  |
| Copolymer C |  | 100% | 100% | 100% | 100% |
| EB Polymer 1 | 100% |  |  |  |  |
| Coat weight (g/m²) | 6 | 4.5 | 6 | 4.5 | 6 |
| Total coat weight (g/m²) | 20 | 15 | 20 | 15 | 20 |
| T-Peel Test (cup-paper) |  |  |  |  |  |
| 130° C. | 1.7 | 1.8 | 1.8 | 2.7 | 2.5 |
| Seal strength |  |  |  |  |  |
| 100° C. | — | — | — | 8.7 | 10.0 |
| 110° C. | — | — | — | 9.7 | 12.2 |
| Neck-in measurement(mm) | 135 | 60 | 60 | 120 | 105 |
| Final coating width Working paper width: 500 mm | 365 | 440 | 440 | 380 | 395 |

The results shown in Tables 3a 3b and Tables 4a 4c are further illustrated in FIGS. 1-2 and 6-7. FIG. 1 shows the seal strength for layers corresponding to Column 2 of Table 3a, Column 4 of Table 3a, and Column 30 of Table 4c. As shown in FIG. 1, use of a Copolymer C tie layer with a thin top layer corresponding to a blend of EB Polymer 1 with Copolymer C resulted in improved seal strength relative to a single layer of EB Polymer 1 with LDPE A or relative to a thicker single layer of LDPE A.

At the thicker coating values shown in Tables 3a-3b and Tables 4a-4c, in addition to evaluating seal strength and sealing on a coated cup, the neck-in value for the extruded coating layer was also evaluated. It is noted that neck-in is a conventional measurement for characterizing polymer layers, and increased neck-in values are usually considered detrimental. As shown in Tables 3a-3b below, at coat weights of 15 g/m² and 20 g/m², the single coating layers involving EB Polymer 1 exhibit substantially increased neck-in values relative to the neck-in values for other conventional coating layers such as Copolymer C and LDPE A.

Figure 2:
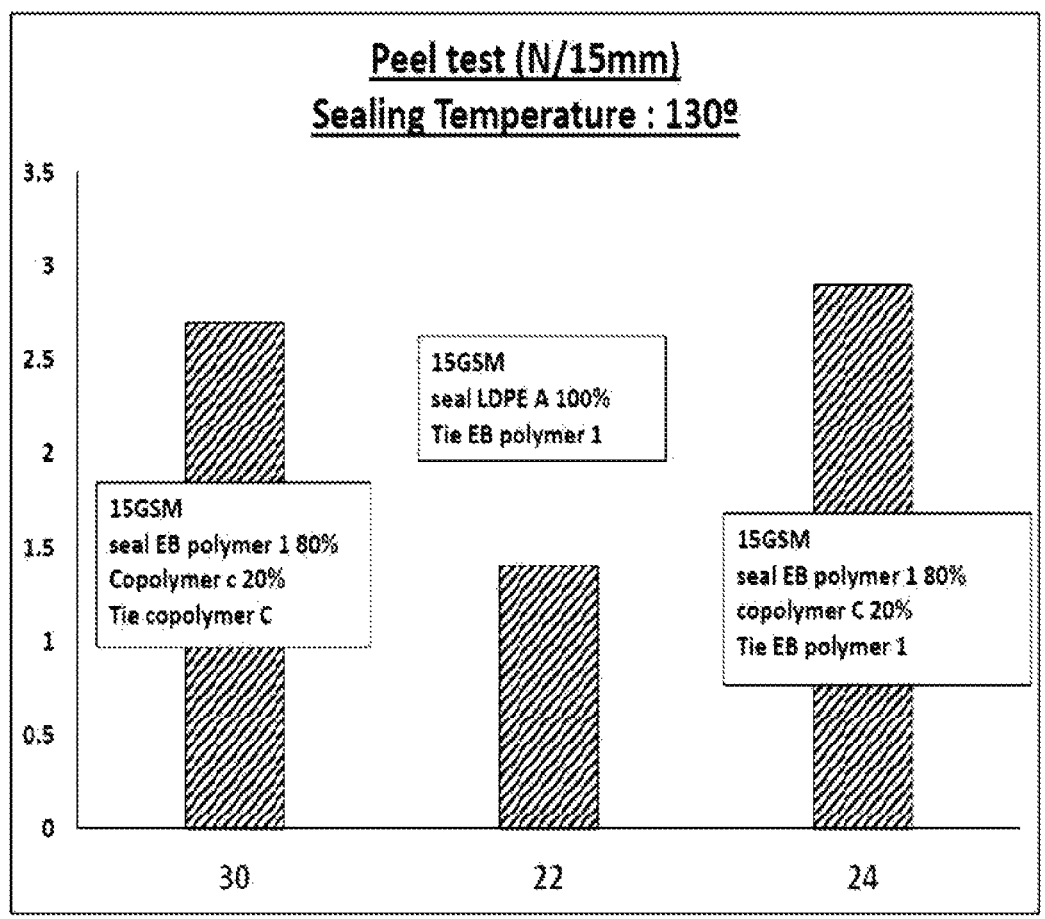
FIG. 2 shows the results of the T-Peel Test on samples formed by sealing a paper substrate coated with various polymeric compositions onto a non-coated but printed board, with seals formed at 130° C.

FIG. 2 shows T-Peel test strength values for the layers corresponding to Column 22 of Table 4a, Column 24 of Table 4b, and Column 30 of Table 4c. As shown in FIG. 2, using a tie layer with a thin layer of EB Polymer 1 and a top layer of a blend of EB Polymer 1 and Copolymer C resulted in a substantially higher T-Peel test value as compared to using the same thin layer of EB Polymer 1 as the tie layer with a conventional LDPE top layer. Further, using a tie layer of a thin layer of Copolymer C with a top layer of a blend of EB Polymer 1 and Copolymer C resulted in a substantially higher T-Peel test value as compared to using a thin layer of EB Polymer 1 as the tie layer with a conventional LDPE top layer.

Figure 6:
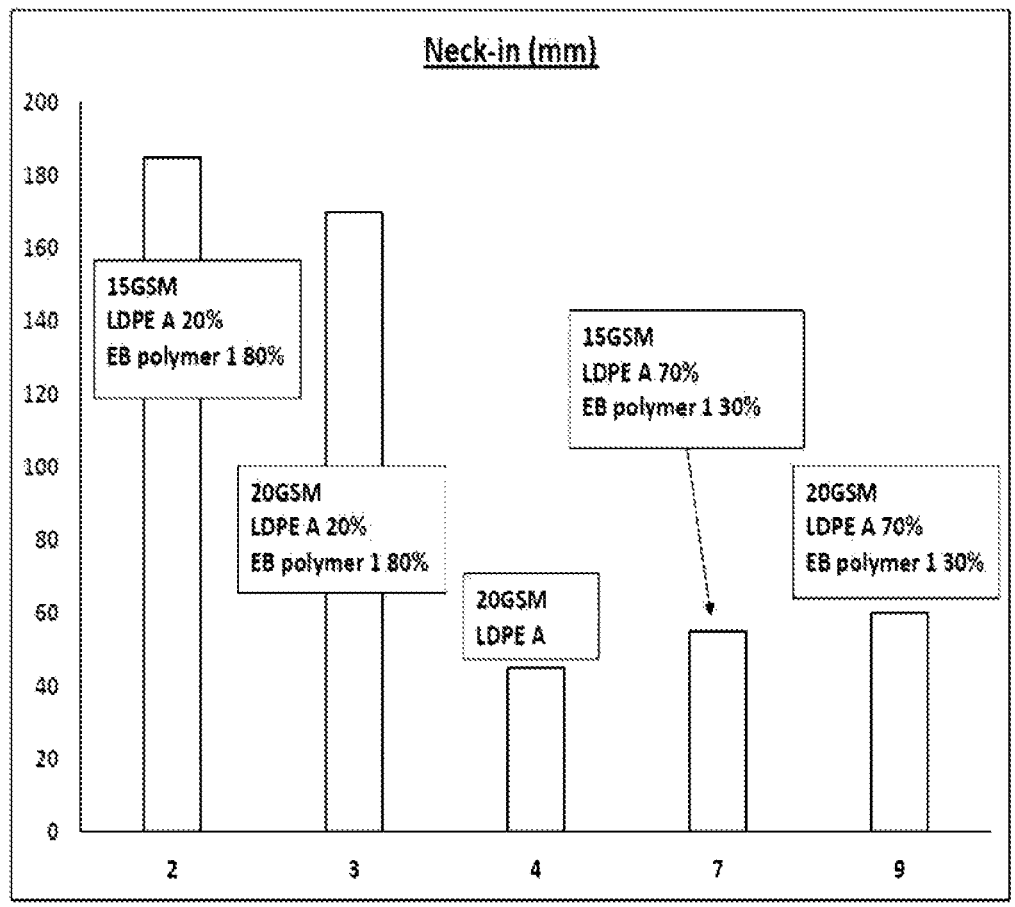
FIG. 6 shows the neck-in values for various polymeric coating compositions.
Figure 7:
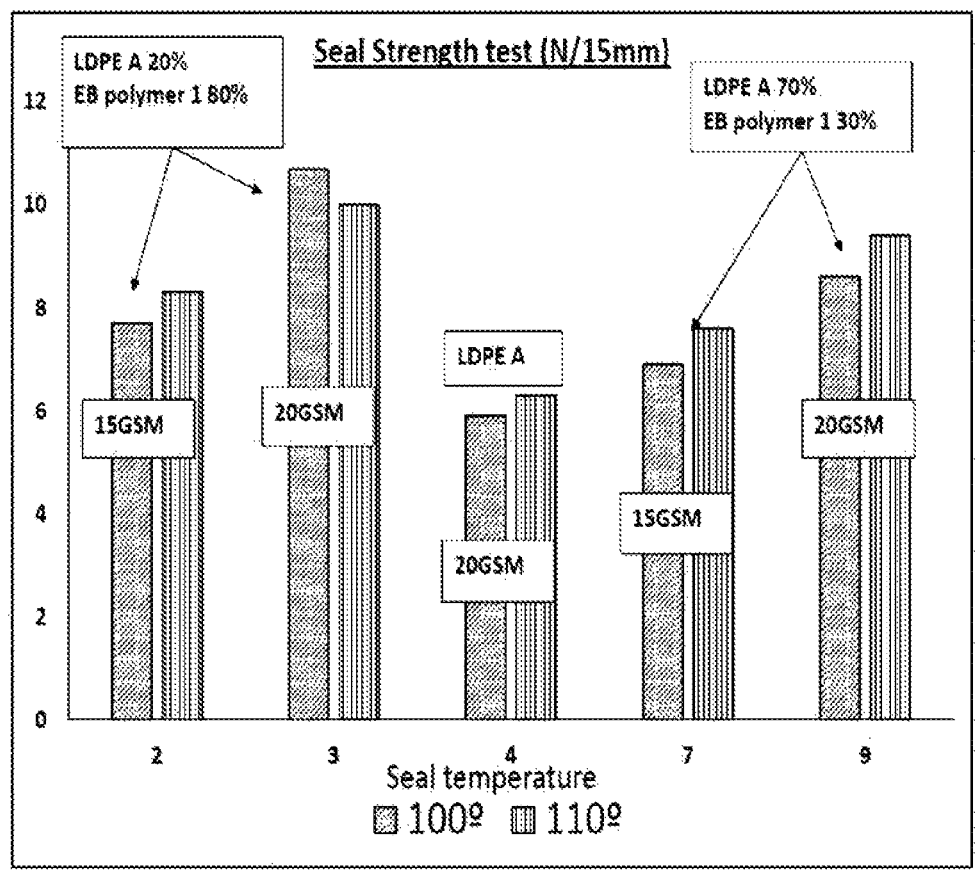
FIG. 7 shows the results of the Seal Strength Test on paper substrates coated with various polymeric coating compositions, with seals formed at 100° C. and 110° C.

FIG. 6 shows the neck-in values for the coatings corresponding to Columns 2-4 in Table 3a and Columns 7 and 9 in Table 3b. FIG. 7 shows the Seal Strength Test data for the same coatings shown in FIG. 6. As shown in FIG. 6, the blends of 80 wt % EB Polymer 1 and 20 wt % LDPE A at thicknesses of 15 g/m² and 20 g/m² would suggest low suitability for formation of thinner coating layers, relative to the LDPE A layers. The blends of 30 wt % EB Polymer 1 and 70 wt % LDPE A have similar neck-in values to the LDPE A layers, but as shown in Table 3b and illustrated in FIG. 7, the coatings in Columns 7 and 9 of Table 3b do not suggest the substantially improved performance for blends of EB Polymer 1 and LDPE that are shown in Tables 1a-1c and Tables 2a-2c.

Figure 8:
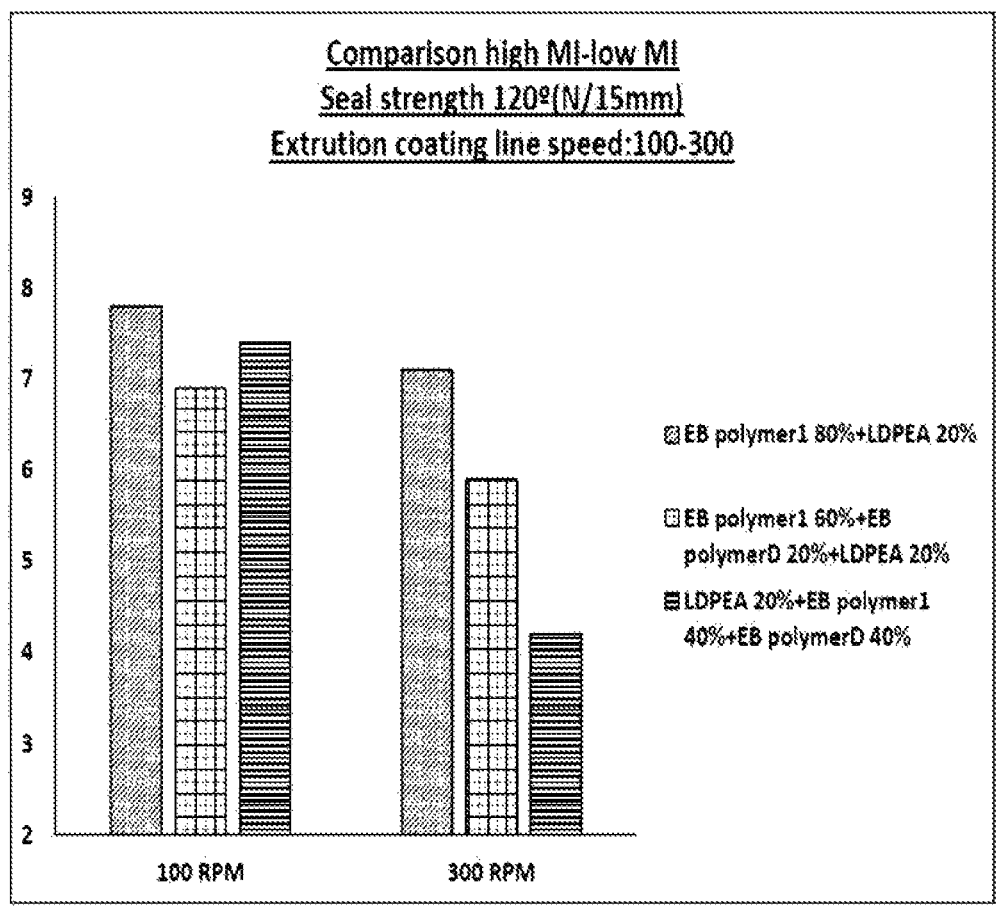
FIG. 8 shows the results of the Seal Strength Test on paper substrates coated with various polymeric coating compositions, where the coating process was performed at a laminator line speed of 100 meters/min and 300 meters/min.

FIG. 8 shows the seal strength for the coatings in Columns 12 and 13 in Table 2b, and Columns 20, 21, 25, and 26 in Table 2c. These coatings correspond to a coat weight of 10 g/m². Columns 12 and 13 correspond to coatings based on 20 wt % of LDPE A and 80 wt % of EB Polymer 1 at laminator line speeds of 100 meters per minute and 300 meters per minute, respectively. Columns 20 and 21 correspond to coatings based on 60 wt % of EB Polymer 1, 20 wt % of LDPE A, and 20 wt % of EB Polymer D at laminator line speeds of 100 meters per minute and 300 meters per minute, respectively. Columns 25 and 26 correspond to coatings based on 40 wt % of EB Polymer 1, 20 wt % of LDPE A, and 40 wt % of EB Polymer D at laminator line speeds of 100 meters per minute and 300 meters per minute, respectively. As shown in FIG. 8, at the higher line speed (300 rpm) the seal strength for the coating containing EB Polymer D at 20 wt % (Column 21) and at 40 wt % (Column 26) exhibited reduced seal strength. These results suggest that the lower melt index of EB Polymer D (~3.5 g/10 min) may adversely affect the coating seal strength.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A coated article, comprising:
   a fibrous substrate;
   a first polymeric coating having opposing first and second surfaces, wherein the first surface of the first polymeric coating is secured to at least a portion of a first surface of the fibrous substrate, the first polymeric coating have a coat weight of about 7 g/m² or less; and a second polymeric coating secured to the second surface of the first polymeric coating, the second polymeric coating having a coat weight of about 15 g/m² or less, wherein the second polymeric coating comprises at least about 40 wt % of an ethylene-based polymer having:

a) a melt index of from about 5 g/10 min to about 30 g/10 min;
b) a melt elastic modulus G' (G"=500 Pa) at 170° C. below 15 Pa;
c) a relaxation time lambda at 170° C. below 0.003 s;
d) at least two second melt temp peaks between 110° C. and 120° C.;
e) a weight average molecular weight (Mw) of from about 10,000 g/mol to about 55,000 g/mol;
f) a molecular weight distribution (Mw/Mn) of from about 2.0 to about 5.0; and
g) a Mz/Mw ratio of from about 1.5 to about 2.1.

2. The coated article according to claim 1, further comprising a sealed seam between a first end of the fibrous substrate and one of: (I) a second end of the fibrous substrate; (II) a portion of a separate fibrous substrate; or (III) a combination thereof, wherein the sealed seam has a seal strength of about 6.0 N/15 mm or more as measured by the Seal Strength Test Method.

3. The coated article according to claim 1, wherein the ethylene-based polymer has one or both of: a density of about 0.910 g/cm³ or greater; and a melt index from about 10 g/10 min to about 25 g/10 min.

4. The coated article according to claim 1, wherein the fibrous substrate comprises paper or paperboard.

5. The coated article according to claim 1, wherein the second polymeric coating comprises from about 40 wt % to about 80 wt % of the ethylene-based polymer, and from about 20 wt % to about 60 wt % of: (i) a low density polyethylene; (ii) an ethylene acrylic acid copolymer; (iii) an ethyl-methyl acrylate copolymer; (iv) a polymer produced by polymerization at a pressure of 50 MPa-g or more; (v) an ethylene-methacrylic acid copolymer; or (vi) a combination thereof.

6. The coated article according to claim 1, wherein the second polymeric coating comprises at least about 70 wt % of the ethylene-based polymer.

7. The coated article according to claim 1, wherein the first polymeric coating comprises an ethylene acrylic acid co-polymer, an ethyl-methyl acrylate co-polymer, an ethylene n-butyl acrylate co-polymer, a maleic anhydride functionalized polyolefin, an ethylene homopolymer, an ethylene co-polymer, or a combination thereof.

8. The coated article according to claim 1, wherein the first polymeric coating comprises an ethylene acrylic acid copolymer.

9. The coated article according to claim 1, wherein the second polymeric coating has a coat weight of about 8 g/m² or less.

10. The coated article according to claim 1, wherein the coated article is adapted for containing food, a beverage, or a cosmetic product.

11. A method of manufacturing a coated article for a container, the method comprising:

receiving a coated fibrous substrate having inner and outer polymeric layers, wherein a first side of the inner polymeric layer is secured to at least a portion of a surface of the fibrous substrate, wherein at least a portion of the outer polymeric layer is secured to at least a portion of a second side of the inner polymeric layer, wherein the outer polymeric layer has a coat weight of about 15 g/m² or less, and wherein the outer polymeric layer comprises at least about 40 wt % of an ethylene-based polymer having:

a) a melt index of from about 5 g/10 min to about 30 g/10 min;
b) a melt elastic modulus G' (G"=500 Pa) at 170° C. below 15 Pa;
c) a relaxation time lambda at 170° C. below 0.003 s;
d) at least two second melt temp peaks between 110° C. and 120° C.;
e) a weight average molecular weight (Mw) of from about 10,000 g/mol to about 55,000 g/mol;
f) a molecular weight distribution (Mw/Mn) of from about 2.0 to about 5.0; and
g) a Mz/Mw ratio of from about 1.5 to about 2.1; and sealing a first end of the coated fibrous substrate to one of: (i) a second end of the coated fibrous substrate; (ii) a portion of a separate fibrous substrate; or (iii) a combination thereof, thereby forming a sealed seam of a coated article, wherein the sealed seam has a seal strength of about 6.0 N/15 mm or more as measured by the Seal Strength Test Method.

12. The method according to claim 11, wherein the coated fibrous substrate was formed via co-extrusion coating the inner and outer polymeric layers onto the fibrous substrate.

13. The method according to claim 11, wherein the sealing the first end of the coated fibrous substrate comprises exposing the coated fibrous substrate to thermal energy sufficient to form the sealed seam.

14. The method according to claim 11, wherein the ethylene-based polymer has one or both of: a density about 0.910 g/cm³ or greater; and a melt index from about 10 g/10 min to about 25 g/10 min.

15. The method according to claim 11, wherein the fibrous substrate comprises paper or paperboard.

16. The method according to claim 11, wherein the container is a food container, a beverage container, or a cosmetic product container.

17. The method according to claim 11, wherein the second polymeric coating comprises at least about 70 wt % of the ethylene-based polymer.

18. The method according to claim 11, wherein the second polymeric coating comprises an ethylene acrylic acid co-polymer, an ethyl-methyl acrylate co-polymer, an ethylene n-butyl acrylate co-polymer, a maleic anhydride functionalized polyolefin, an ethylene homopolymer, an ethylene co-polymer, or a combination thereof.

19. The method according to claim 11, wherein the second polymeric coating has a coat weight of about 8 g/m² or less.

* * * * *